(12) United States Patent
Comay et al.

(10) Patent No.: US 11,886,330 B1
(45) Date of Patent: Jan. 30, 2024

(54) SYSTEM, METHOD, AND COMPUTER PROGRAM FOR GENERATING A CONTEXT VISUALIZATION DURING TEST AUTOMATION

(71) Applicant: Amdocs Development Limited, Limassol (CY)

(72) Inventors: Alon Japheth Comay, Ein Dor (IL); Vladimir Tkach, Kefar Yona (IL); Itai Farber, Tel Aviv (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 83 days.

(21) Appl. No.: 17/349,740

(22) Filed: Jun. 16, 2021

(51) Int. Cl.
  *G06F 11/36* (2006.01)
  *G06F 11/32* (2006.01)

(52) U.S. Cl.
  CPC ........ *G06F 11/3688* (2013.01); *G06F 11/324* (2013.01); *G06F 11/3684* (2013.01); *G06F 11/3692* (2013.01)

(58) Field of Classification Search
  CPC .............. G06F 11/3688; G06F 11/324; G06F 11/3684; G06F 11/3692
  See application file for complete search history.

(56) References Cited

U.S. PATENT DOCUMENTS

| | | | |
|---|---|---|---|
| 7,840,851 B2 | 11/2010 | Hayutin | |
| 8,239,831 B2 | 8/2012 | Brennan et al. | |
| 8,776,023 B2 | 7/2014 | LeSuer et al. | |
| 8,924,934 B2 | 12/2014 | Sullivan et al. | |
| 9,075,918 B1 | 7/2015 | Chandra et al. | |
| 2006/0005132 A1* | 1/2006 | Herdeg, III | G06F 11/3684 714/E11.193 |
| 2009/0217309 A1* | 8/2009 | Grechanik | G06F 11/3692 719/328 |
| 2013/0159890 A1* | 6/2013 | Rossi | G06F 11/3684 715/762 |
| 2014/0366005 A1* | 12/2014 | Kozhuharov | G06F 11/3696 717/125 |
| 2015/0254170 A1* | 9/2015 | Gillaspie | G06F 11/3684 714/38.1 |
| 2017/0277625 A1* | 9/2017 | Shtuchkin | G06F 11/3688 |
| 2021/0081294 A1 | 3/2021 | Golubev | |
| 2021/0081308 A1* | 3/2021 | Golubev | G06F 11/3688 |
| 2021/0081309 A1* | 3/2021 | Golubev | G06F 11/0772 |

FOREIGN PATENT DOCUMENTS

CN  104834595 A  8/2015

* cited by examiner

*Primary Examiner* — Wei Y Zhen
*Assistant Examiner* — Brahim Bourzik
(74) *Attorney, Agent, or Firm* — Zilka-Kotab, P.C.

(57) ABSTRACT

As described herein, a system, method, and computer program are provided for generating a context visualization during test automation. In use, during automated testing of a user interface application, an inspection of an element within a user interface of the user interface application is detected. Additionally, in response to detecting the inspection of the element, a visualization of the element within the user interface is generated. Further, the visualization of the element within the user interface is presented with information associated with the inspection of the element.

13 Claims, 9 Drawing Sheets

SYSTEM, METHOD, AND COMPUTER PROGRAM FOR GENERATING A CONTEXT VISUALIZATION DURING TEST AUTOMATION

FIELD OF THE INVENTION

The present invention relates to test automation tools.

BACKGROUND

Test automation tools are software programs that automate testing of applications and/or systems. The time duration of an end-to-end test execution by a test automation tool is typically long (~40 minutes). Typically, results of the testing are only made available once the testing is completed and do not indicate the context (i.e. the element or event) being tested as a test suit is being run. As a result, during the testing time the tool may not always indicate if there is a problem that is occurring or where the problem is occurring.

Even once the testing has completed and an error is indicated in a user interface, a particular flow that leads to the error must be derived from the logs, which is time consuming. Since current test automation tools do not provide any visual feedback from the screen to indicate the current action that is taking place during the running test, many dynamic behaviors can be missed, such as full screen transparent loaders, masks, dynamic alerts, etc.

There is thus a need for addressing these and/or other issues associated with the prior art.

SUMMARY

As described herein, a system, method, and computer program are provided for generating a context visualization during test automation. In use, during automated testing of a user interface application, an inspection of an element within a user interface of the user interface application is detected. Additionally, in response to detecting the inspection of the element, a visualization of the element within the user interface is generated. Further, the visualization of the element within the user interface is presented with information associated with the inspection of the element.

DETAILED DESCRIPTION

Figure 1:
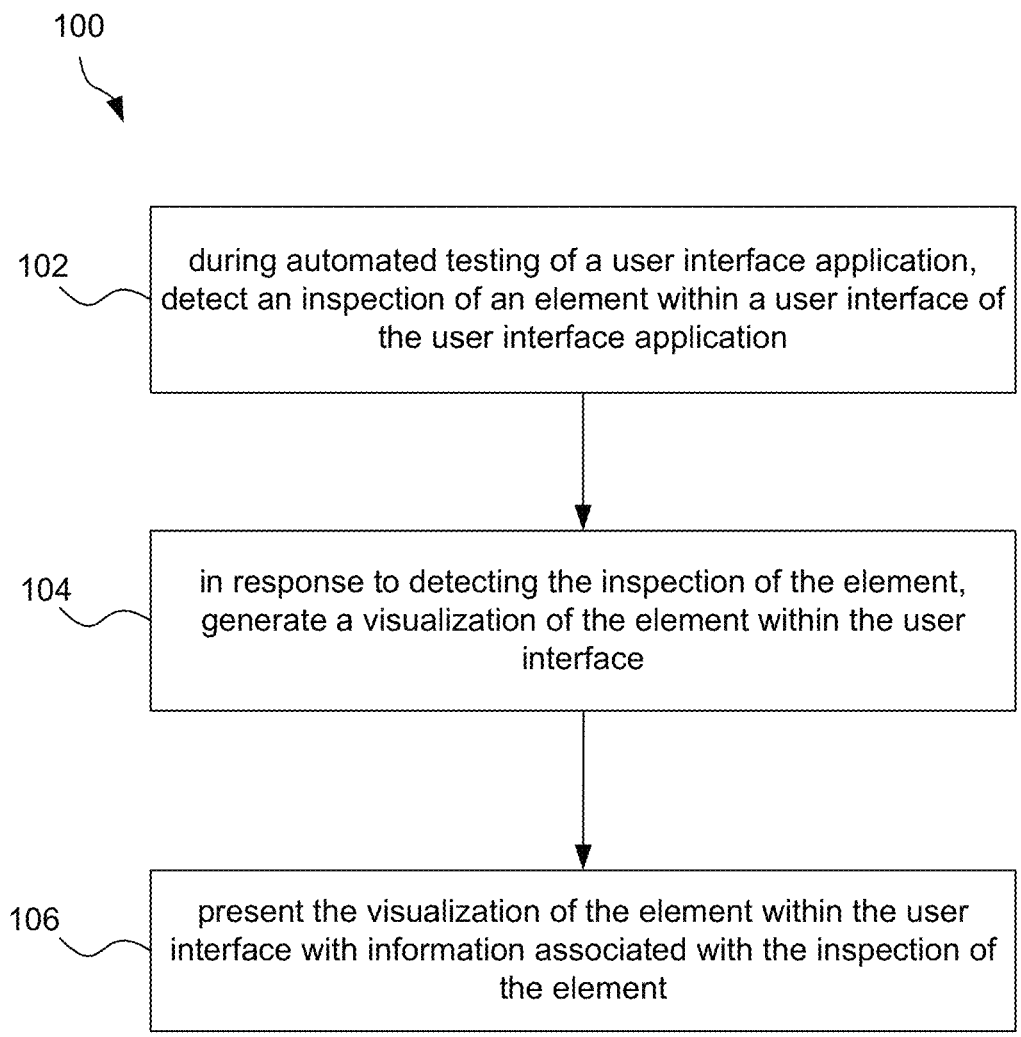
FIG. 1 illustrates a method for generating a context visualization during test automation, in accordance with one embodiment.

FIG. 1 illustrates a method 100 for generating a context visualization during test automation, in accordance with one embodiment. The method 100 may be performed by any computer system, such as those described below with respect to FIGS. 4 and/or 5. For example, the method 100 may be performed by a computer system that provides automated testing of a user interface application. The method 100 may be performed as part of a test automation tool executing on the computer system to provide the automated testing of the user interface application. The user interface application may, or may not, be located on the computer system.

In operation 102, during automated testing of a user interface application, an inspection of an element within a user interface of the user interface application is detected. The user interface application may be any application (e.g. program, etc.) having at least one user interface (i.e. graphical user interface (GUI)) that in turn as has least one element. The element may refer to a graphical element (e.g. Web element) within the user interface. For example, the element may be an input element, such as a text box, check box, radial button, drop down menu, command button, etc.

The automated testing of the user interface application may refer to any test or suite of tests executed to at least inspect one or more elements of one or more user interfaces of the user interface application. Thus, the inspection of the element may include a test performed in association with the element. For example, the inspection may refer to verifying a correct operation of the element or a correct functionality of the user interface application in association with the element. As noted above, the automated testing may be performed by a test automation tool. It should be noted that the automated testing may be performed as a part of development of the automated testing for the user interface application or after development of the automated testing is complete. As an option, the automated testing may be configured to focus on elements of the user interface that are determined to be most critical or changed from prior version, which may be identified using machine learning.

As mentioned above, during the automated testing of the user interface application, an inspection of an element within a user interface of the user interface application is detected. The inspection of the element may be detected using functionality of the test automation tool performing the automated testing. For example, such functionality may include a flow for waiting for the element and/or a flow for waiting for the element to be added to a document object model (DOM). Of course, however, the inspection of the element may be detected in any desired manner.

In operation 104, in response to detecting the inspection of the element, a visualization of the element within the user interface is generated. The visualization refers to a graphical representation of the element within the user interface. For example, the visualization may be generated, at least in part, by capturing a screenshot of the element within the user interface.

In one embodiment, the element may be highlighted within the visualization. The highlighting of the element may distinguish the element from other elements in the user interface, for example. The element may be highlighted by presenting a semi-opaque colored object overlaid on the element, as an option. As another option, the element may be highlighted by outlining the element in a predefined color.

In one embodiment, the visualization may be generated using functionality of the test automation tool performing the automated testing. In another embodiment, the visualization may be stored in memory. For example, the visualization may be logged in a log of the test automation tool.

In operation 106, the visualization of the element within the user interface is presented with information associated with the inspection of the element. Presenting the visualization with the information refers to causing the visualization to be displayed with the information for viewing by a user. In one embodiment, the visualization may be presented using functionality of the test automation tool performing the automated testing.

With respect to the embodiment where the visualization is stored in memory, once generated, it should be noted that the visualization may be stored in the memory with the information associated with the inspection of the element. For example, the information may be captured, recorded, or otherwise identified when the inspection of the element is detected. In any case, the visualization and the information may be retrieved from the memory for presentation. As an example, the visualization and the information may be accessed from the memory for presentation in response to a request (e.g. from a user, from functionality of the test automation tool, etc.).

As another option, the visualization may be generated to include the information. In one embodiment, the information may be presented as a new element (i.e. graphical element) within the user interface.

It should be noted that the information associated with the inspection of the element may include any information describing or otherwise relevant to the inspection of the element. In one embodiment, the information may indicate an event triggered on the element (e.g. during the testing). For example, the event may be a keyboard entry performed in association with (e.g. on) the element, a mouse click performed in association with (e.g. on) the element, etc. In another embodiment, the information may include metadata associated with the event.

To this end, visualization of an element that is subject to inspection during testing of the user interface application may be generated and presented. This may allow a user to view a context of the testing (e.g. even while the testing is being run). Any errors encountered during the testing with respect to the element may also be presented in conjunction with the visualization, thereby allowing the user to understand the context of the error. As an option, the visualization may also be used to present an indication of a difference between the user interface and a prior version of the user interface (i.e. from a prior version of the user interface application), such as via an image diff.

In an embodiment, the method 100 may be performed for each element within each user interface of the user interface application that is inspected during the automated testing of the user interface application. In this way, a visualization of a flow of the testing may be presented, as an option.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
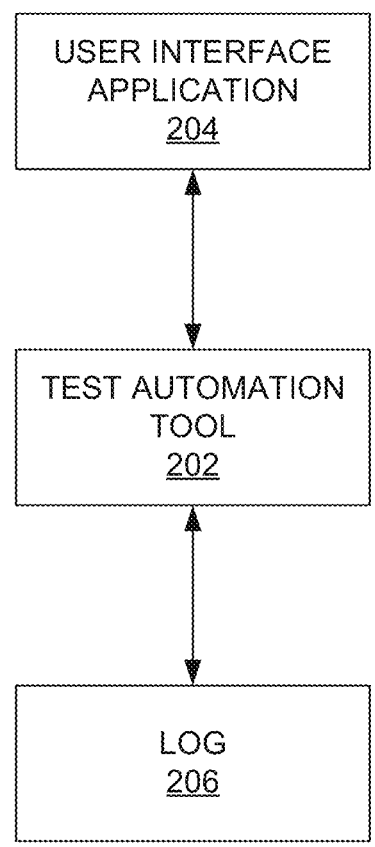
FIG. 2 illustrates a flow diagram of a system for using an automation tool to generating a context visualization during test automation, in accordance with one embodiment.

FIG. 2 illustrates a flow diagram of a system 200 for using an automation tool to generating a context visualization during test automation, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a test automation tool 202 interacts with a user interface application 204 to perform automated testing of the user interface application 204. In the present embodiment, the automated testing is performed on at least one element of at least one user interface of the user interface application 204.

During the automated testing, the test automation tool 202 detects an inspection of an element within the user interface of the user interface application 204. The test automation tool 202 may be configured to handle different states of the element within the user interface, such as the states shown in Table 1.

Table 1
1) Wait for display—wait until the element is in the view port.
2) Wait for presence—wait until element is in the DOM.
3) Wait for click—wait until element can be clicked.

Table 2 shows an exemplary function of the automation tool flow for waiting for a web element.

TABLE 2

```
/**
 * _waitFor
 * @param {string} type
 * @param $locator
 * @param {number} timeout
 * @param {boolean} [_not]
 * @returns {*}
 * @private
 */
function _waitFor(type, $locator, timeout, _not) {
  let waitOn = EC[type] ($locator);
  if (_not) {
    waitOn = EC.not(waitOn);
  }
  return browser.wait(waitOn, timeout).then(condition => {
    expect(condition).toBeTruthy( );
    return $locator;
  });
}
```

Table 3 shows an exemplary method of the automation tool flow for waiting for a web element to be added to a DOM.

TABLE 3

```
/**
 * waitForPresence
 * @property Services
 * @param $locator
 * @param {number} [timeout]
 * @returns {!Thenable.<T>|!
 (promise.Thenable.<T>|WebElement-Promise) | * }
 */
this.waitForPresence = ($locator, timeout) => {
  const promise = _waitFor('presenceOf', $locator, timeout ||
this.DEFAULT_TIMEOUT);
  this.highlightElement($locator);
  return promise;
};
```

In response to the detection of the inspection of the element, the test automation tool 202 generates a visualization of the element within the user interface. The visualization may highlight the element and provides information on any event triggered on it.

Table 4 illustrates an exemplary method for highlighting the element being inspected.

TABLE 4

```
/**
 * @method Services.highlightElement
 * @property Services
 * @param {{getWebElement, getWebElements, getAttribute}} $locator
 * @param {string} [tColor]
 * @returns {promise.Promise.<T>/*}
 */
this.highlightElement = ($locator, tColor) => {
  if (!$locator) return false;
  $locator.getAttribute('style').then(style => {
    ...
    /**
     * script
     * @type {promise.Promise.<T>}
     */
    const script = browser.driver.executeScript(
        'arguments[0].style.boxShadow=" ";' +
        'arguments[0].setAttribute(\'style\', arguments [ 1 ] ) ; ' ,
        $locator.getWebElement( ),
        style + ' ;box-shadow:inset 0 0 0 2px ' + color +
        ',0 0 0 2px ' + color + ' ; '
    );
    return script.then ( ( ) => {
      browser.sleep(500);
      return $locator;
    });
  });
};
```

The test automation tool 202 logs the visualization in a log 206. The test automation tool 202 may also save to the log 206 information indicating any event triggered on the element during the inspection of the element. Events that can be logged are keyboard, mouse, etc. and also all metadata regarding the event.

The test automation tool 202 can then present the visualization of the element within the user interface with the information associated with the inspection of the element. The test automation tool 202 may access the logged visualization/information for presentation thereof. As an option, the test automation tool 202 may add a new element to the visualization that includes the information, such as the event metadata description), for example above the inspected element.

To this end, the embodiment described above provide users of user interface based test automation with added, graphic analysis of the test results, to allow the user to better understand the purpose of each test, the coverage of the tests, and the analysis of the error for tests which ended with failure or got hanged in mid process. In one embodiment, the contextual visualization may be provided as functionality that augments existing functionality of a test automation tool (e.g. automation platform) running the tests, to enrich the results provided by the tool. As a result, the functionality may be agnostic to the test automation tool used and agnostic to the web browser or operation system that the user interface tests are running on.

In addition to drastically reducing test execution and/or test development time by allowing users to understand errors as they occur, the contextual visualization may also be used to educate the user on what user interface application features the test automation truly covered and to give the user clarity about the exact point of failure.

Existing test automation tools exhibit various limitations, including:

1) The user running the test automation is in most cases not the person who developed the automation script and therefore is almost always unaware of the exact content of the automation or the exact validations the automation performs or skips.
2) Maintenance of test automation is challenging as the user maintaining the automation does so long after the automation was created and is in many cases unaware of the exact changes done to the tested system's screens since the automation was created.
3) User interface based test automation often require human validation of the results to ensure graphic elements appear properly to a human eye. The automation role is to generate the test flow and pull the screen shots for the user to validate. The human validation process is to review a flow of screen shots and confirm each one. However as the tool provides clear screen shots with no guidelines on the specific tested item, the human validating is challenged to correctly focus on the right items.

However, examples of the benefits of the contextual visualization described herein include:

1) An analysis layer of the test, presented graphically on the screen shots taken by the test automation tool, will help educate the user on the result of the test and make sure he is able to track the flow, understand its coverage and quality, accelerate maintenance of the automation flow, and accelerate and improve proper issues reporting from failed test automation.
2) Providing element specific comparison between previous and current product versions.
3) Machine learning service provides additional ability to define most critical/changed areas in the user interface. This will help to predict most critical areas in the new web pages with a similar user interface structure (e.g. using the same elements). As a result, testing of the user interface application may be adapted to focus on the elements in the most critical/changed areas in the user interface.

Figure 3:
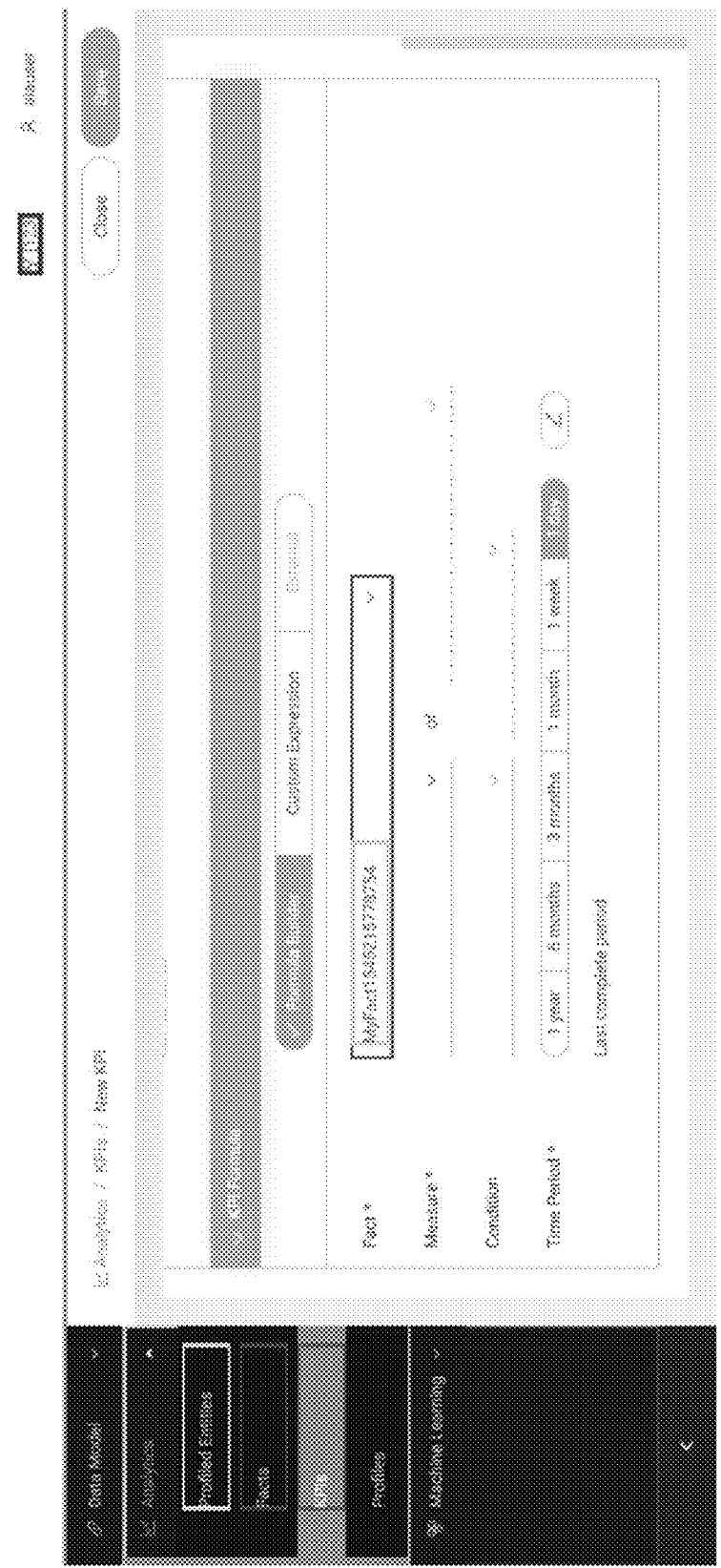
FIG. 3 illustrates an exemplary presentation of a context visualization during test automation, in accordance with one embodiment.

FIG. 3 illustrates a exemplary presentation 300 of a context visualization during test automation, in accordance with one embodiment. The presentation 300 highlights the element inspected during testing. The presentation 300 also includes an indication of the keyboard input event that occurred during the testing, which is shown as the text input to the element.

Figure 4:
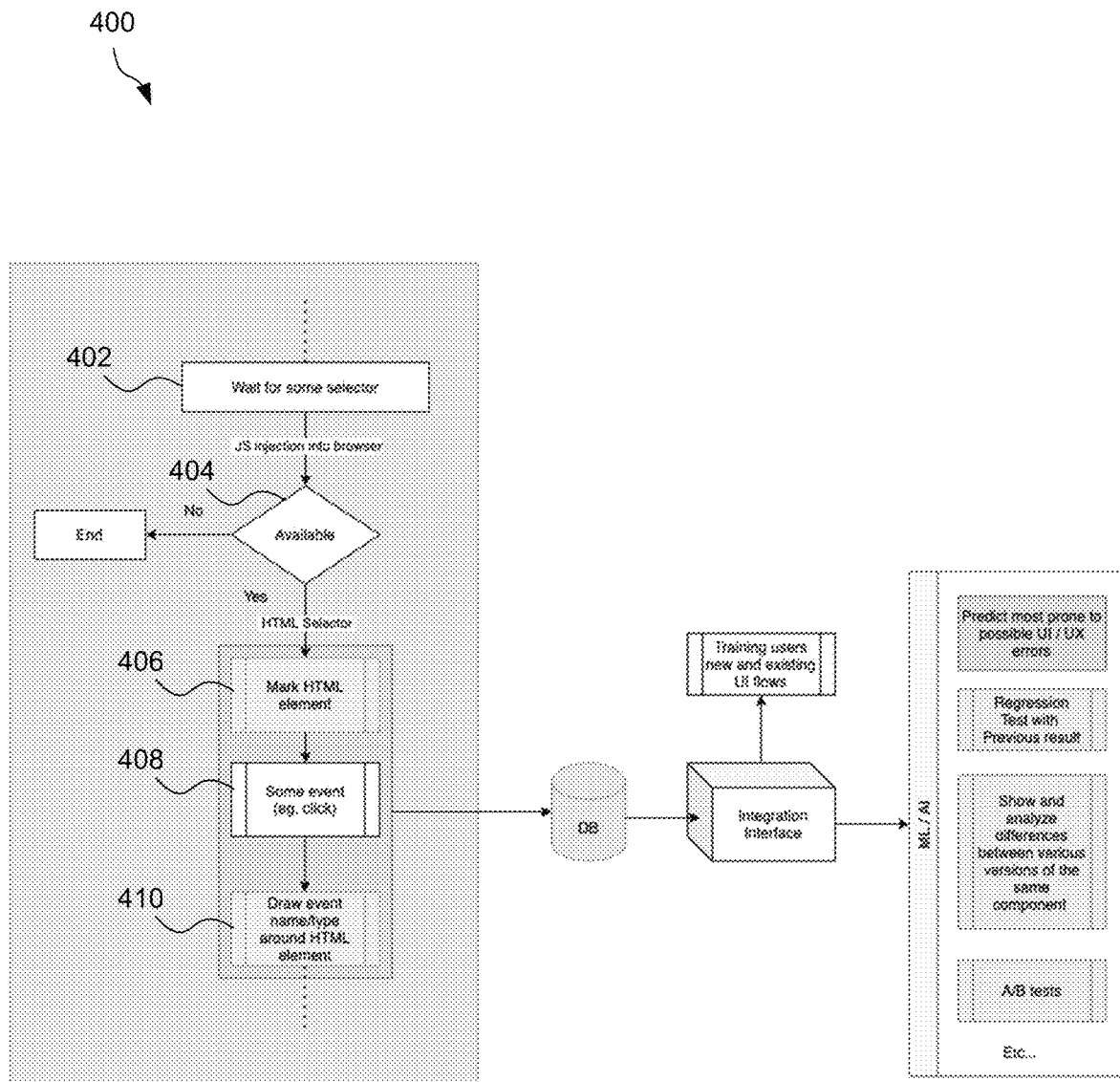
FIG. 4 illustrates a flowchart of a method of an automation tool for generating a context visualization during test automation, in accordance with one embodiment.

FIG. 4 illustrates a flowchart of a method 400 of an automation tool for generating a context visualization during test automation, in accordance with one embodiment. The method 400 may be performed by the test automation tool 202 of FIG. 2, for example.

Figure 5:
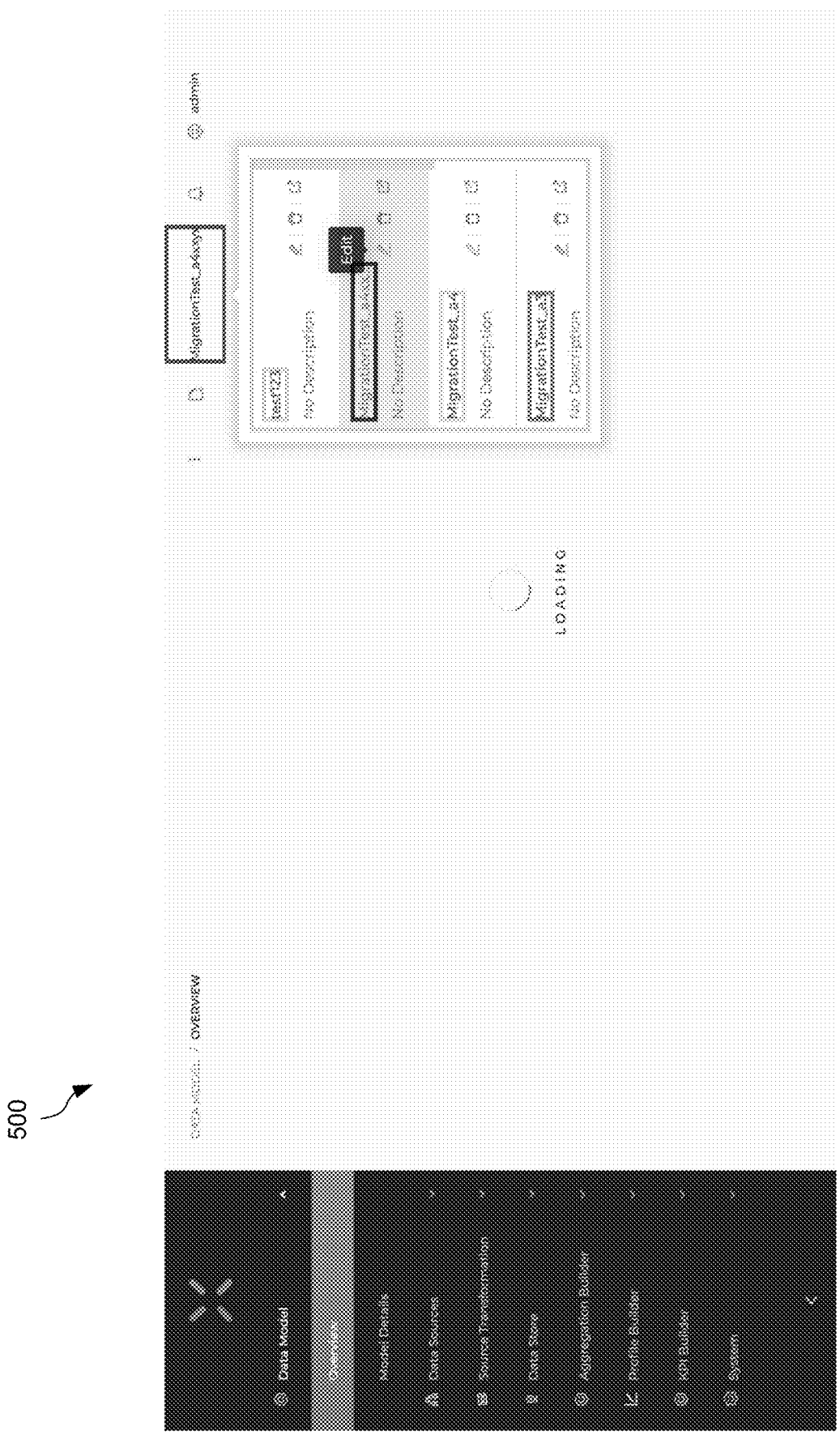
FIG. 5 illustrates a screenshot of a custom event around selector, in accordance with one embodiment.

As shown in operation 402, the method 400 initially waits for a selector. The selector refers to a function that detects an inspection of a HyperText Markup Language (HTML) element within the user interface of a user interface application for the purpose of generating a context visualization associated with the HTML element. FIG. 5 illustrates a screenshot 500 of a custom event around selector, in accordance with one embodiment.

Figure 6:
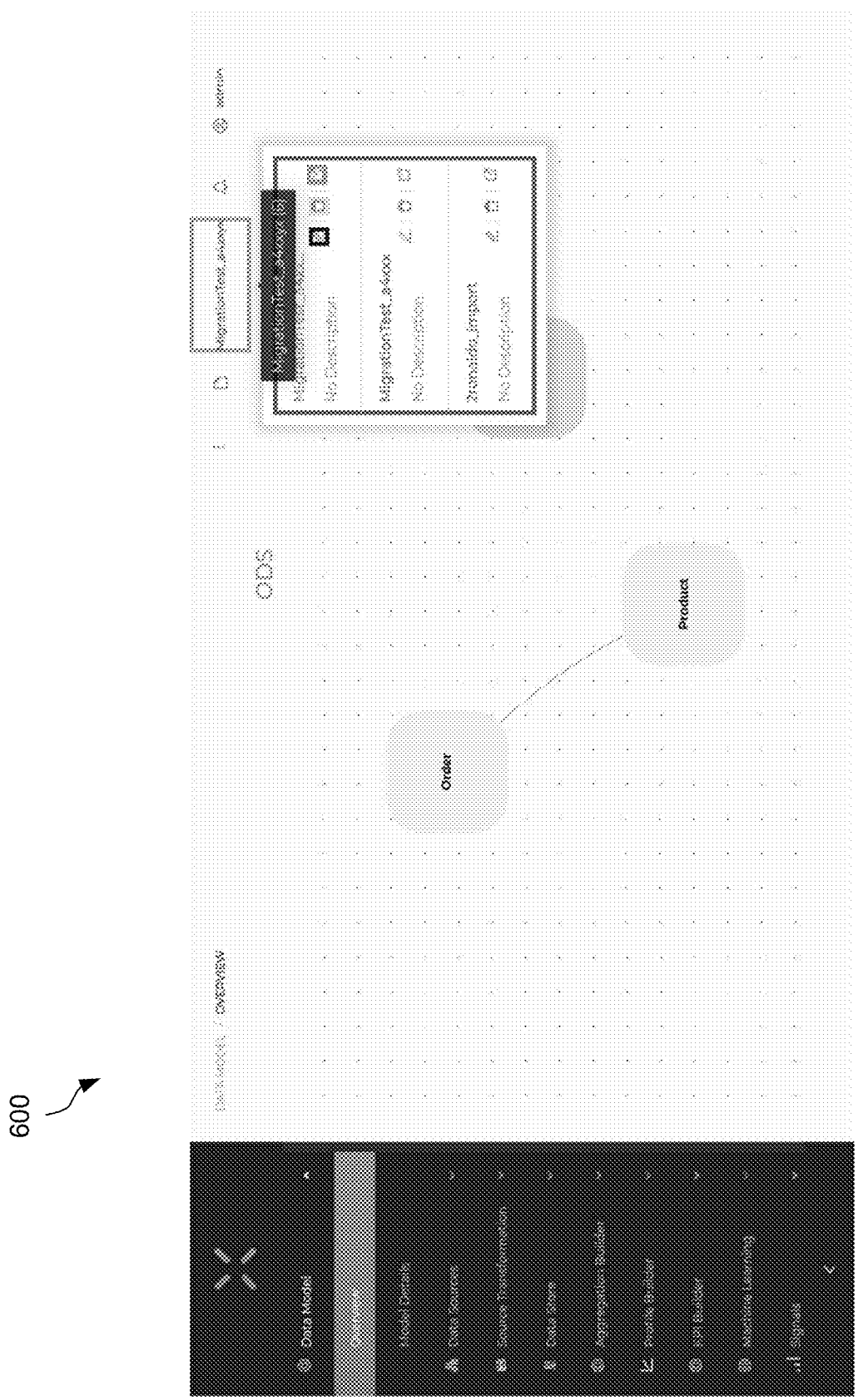
FIG. 6 illustrates a screenshot showing a full cropped text area, in accordance with one embodiment.

When it is determined in decision 404 that a selector is available, the selector marks the HTML element (operation 406, as illustrated in the screen shot 600 of FIG. 6), identifies an event occurring in association with the HTML element (operation 408), and draws an event name and/or event type around the HTML element (operation 410).

Figure 7:
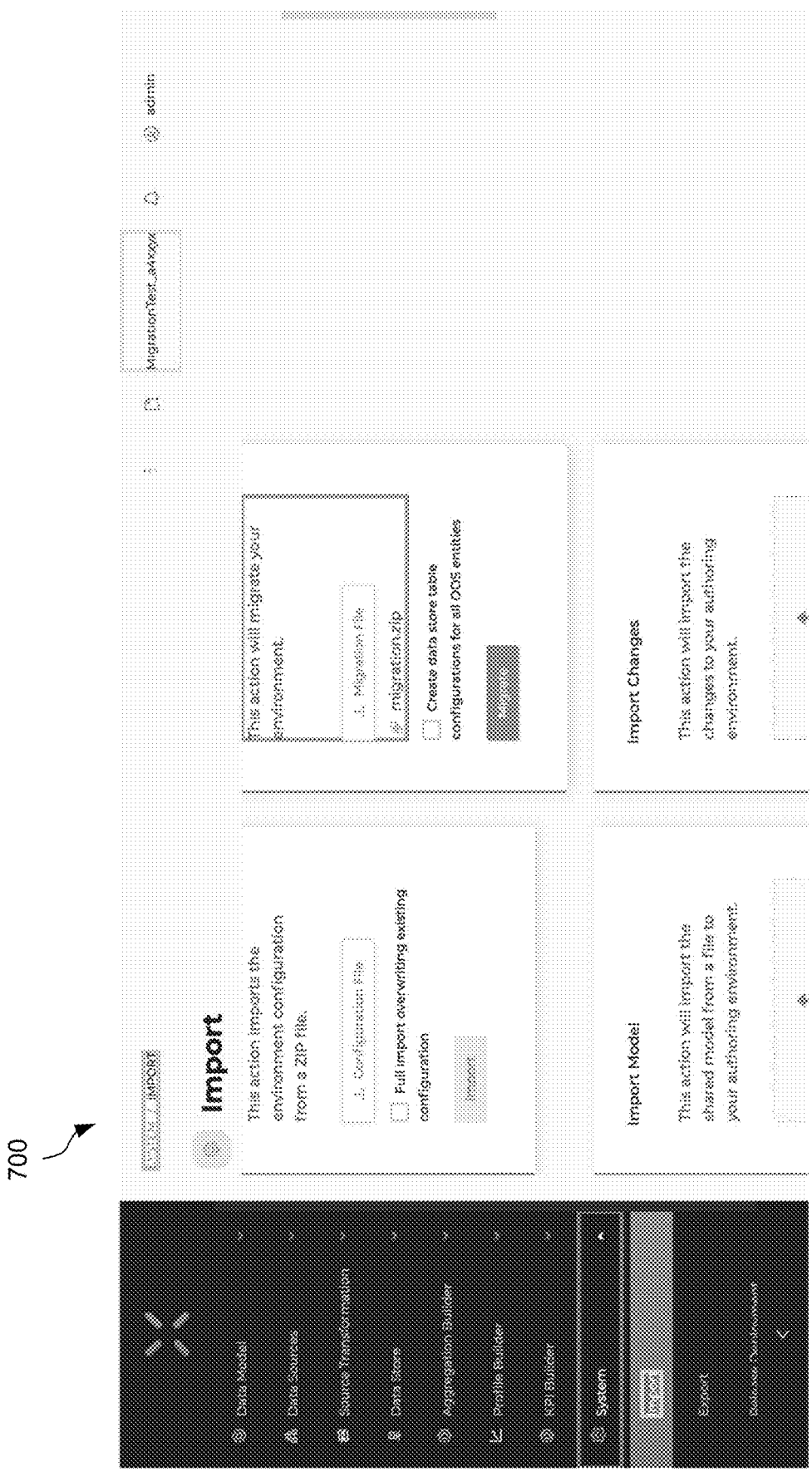
FIG. 7 illustrates a screenshot showing an uploaded file, in accordance with one embodiment.

Information associated with the inspection of the HTML element is also stored to a database (DB), as shown. The information may be uploaded to the DB as a file (e.g. as illustrated in the screen shot 700 of FIG. 7). The information, along with information associated with inspections of other HTML elements, is accessed from the DB by an integration interface for training users new and existing flows. The information, along with information associated with inspections of other HTML elements, is also accessed from the DB by the integration interface for the purpose of applying machine learning (ML)/artificial intelligence (AI) processes. The ML/AI processes may use the information (1) to predict user interface elements that are most prone to user interface and/or user experience (UI/UX) errors, (2) to perform regression tests with previous results, (3) to show/analyze differences between different versions of a same element, (4) to perform A/B tests, etc.

Figure 8:
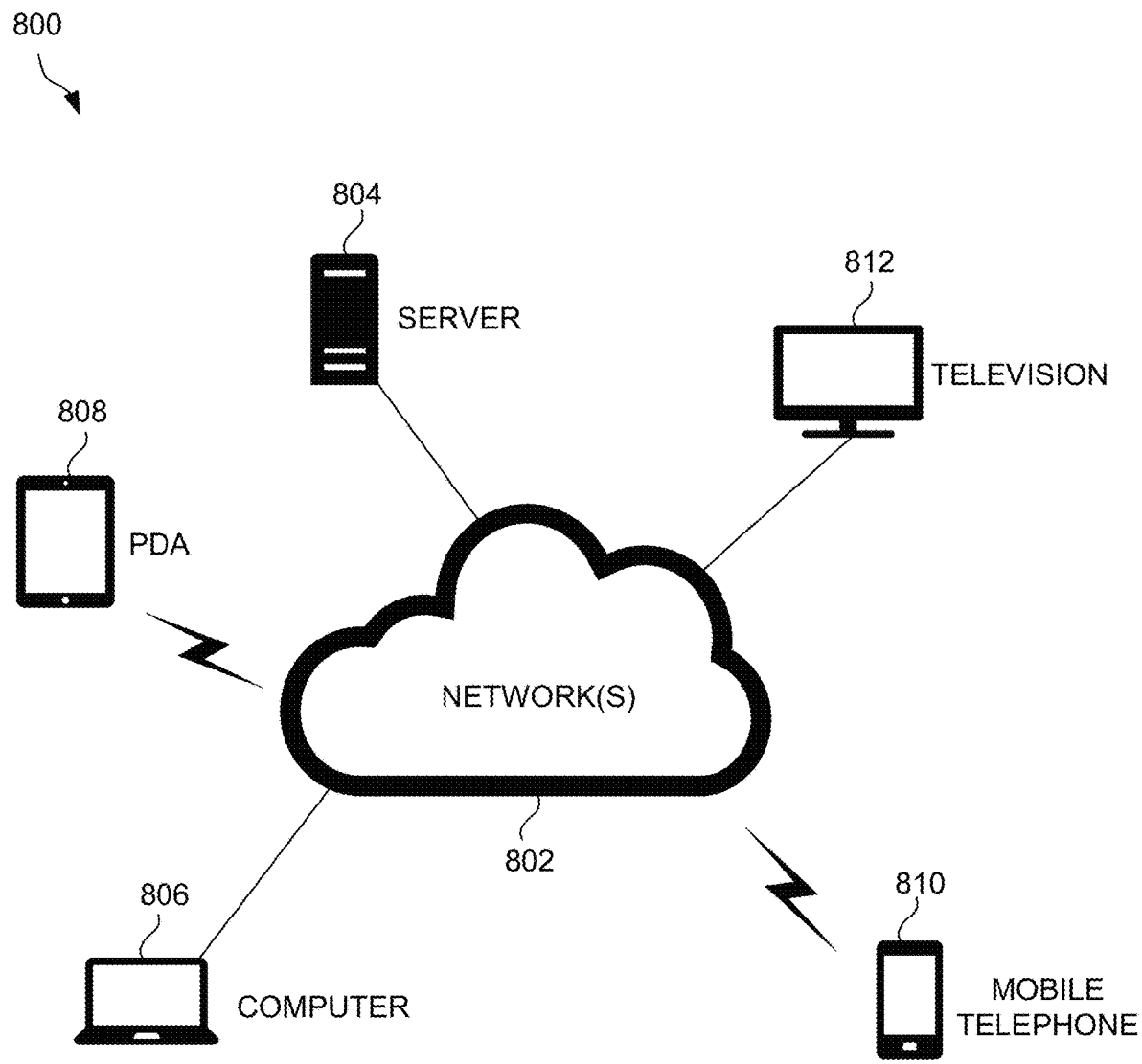
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
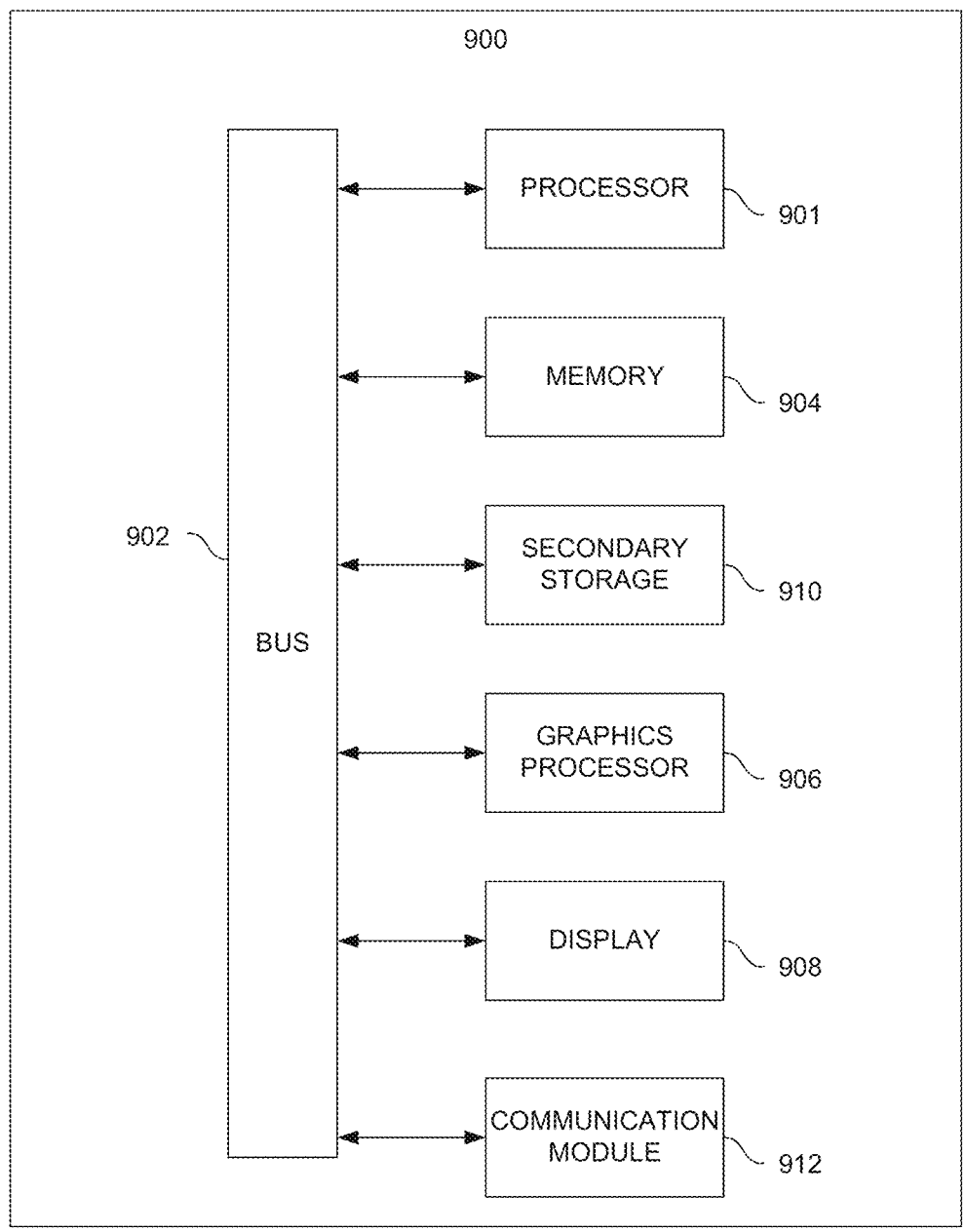
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   detect each input element within a user interface of a user interface application that is being tested during automated testing of the user interface application by a test automation tool, wherein the testing of each input element is performed to verify a correct operation of the input element or a correct functionality of the user interface application in association with the input element;
   for each input element detected as being tested during the automated testing:
      (a) capture information associated with the testing of the input element, wherein the information indicates an event triggered on the input element during the testing of the input element;
      (b) element, generate a visualization of the input element within the user interface by:
         capturing a screenshot of the input element within the user interface,
         highlighting the input element within the visualization to distinguish the input element from other elements in the user interface, and
         including in the visualization the information associated with the testing of the input element;
      (c) log, in a log of the test automation tool, the visualization of the input element within the user interface;
   after the testing of the user interface application, present a visualization of a flow of the testing including, for each input element detected as being tested during the automated testing:
      (a) receive a request associated with the input element within the user interface;
      (b) retrieve, from the log, the visualization of the input element within the user interface;
      (c) after retrieving the visualization of the input element within the user interface from the log, present the visualization of the input element within the user interface.

2. The non-transitory computer-readable media of claim 1, wherein the event is a keyboard entry performed in association with the input element.

3. The non-transitory computer-readable media of claim 1, wherein the event is a mouse click performed in association with the input element.

4. The non-transitory computer-readable media of claim 1, wherein the testing of the input element is detected using functionality of the test automation tool performing the automated testing.

5. The non-transitory computer-readable media of claim 4, wherein the functionality includes a flow for waiting for the input element.

6. The non-transitory computer-readable media of claim 5, wherein the functionality includes a flow for waiting for the input element to be added to a document object model (DOM).

7. The non-transitory computer-readable media of claim 1, wherein the visualization is generated using functionality of the test automation tool performing the automated testing.

8. The non-transitory computer-readable media of claim 1, wherein the visualization is presented using functionality of the test automation tool performing the automated testing.

9. A method, comprising:

at a computer system:

detecting each input element within a user interface of a user interface application that is being tested during automated testing of the user interface application by a test automation tool, wherein the testing of each input element is performed to verify a correct operation of the input element or a correct functionality of the user interface application in association with the input element;

for each input element detected as being tested during the automated testing:
- (a) capturing information associated with the testing of the input element, wherein the information indicates an event triggered on the input element during the testing of the input element;
- (b) generating a visualization of the input element within the user interface by:
  - capturing a screenshot of the input element within the user interface,
  - highlighting the input element within the visualization to distinguish the input element from other elements in the user interface, and
  - including in the visualization the information associated with the testing of the input element;
- (c) logging, in a log of the test automation tool, the visualization of the input element within the user interface;

after the testing of the user interface application, presenting a visualization of a flow of the testing including, for each input element detected as being tested during the automated testing:
- (a) receiving a request associated with the input element within the user interface;
- (b) retrieving, from the log, the visualization of the input element within the user interface;
- (c) after retrieving the visualization of the input element within the user interface from the log, presenting the visualization of the input element within the user interface.

10. A system, comprising:

a non-transitory memory storing instructions; and one or more processors in communication with the non-transitory memory that execute the instructions to:

detect each input element within a user interface of a user interface application that is being tested during automated testing of the user interface application by a test automation tool, wherein the testing of each input element is performed to verify a correct operation of the input element or a correct functionality of the user interface application in association with the input element;

for each input element detected as being tested during the automated testing:
- (a) capture information associated with the testing of the input element, wherein the information indicates an event triggered on the input element during the testing of the input element;
- (b) generate a visualization of the input element within the user interface by:
  - capturing a screenshot of the input element within the user interface,
  - highlighting the input element within the visualization to distinguish the input element from other elements in the user interface, and
  - including in the visualization the information associated with the testing of the input element;
- (c) log, in a log of the test automation tool, the visualization of the input element within the user interface;

after the testing of the user interface application, present a visualization of a flow of the testing including, for each input element detected as being tested during the automated testing:
- (a) receive a request associated with the input element within the user interface;
- (b) retrieve, from the log, the visualization of the input element within the user interface;
- (c) after retrieving the visualization of the input element within the user interface from the log, present the visualization of the input element within the user interface.

11. The non-transitory computer-readable media of claim 1, wherein the device is further caused to:

present, in conjunction with the visualization, one or more errors encountered during the testing of the input element.

12. The non-transitory computer-readable media of claim 1, wherein the visualization is used to present an indication of a difference between the user interface and a prior version of the user interface, wherein the indication is presented via an image diff.

13. The non-transitory computer-readable media of claim 11, wherein the one or more errors are presented graphically on the screen shot of the input element.

\* \* \* \* \*